R. H. BLACKALL.
RATCHET BRAKE LEVER.
APPLICATION FILED APR. 22, 1913.
1,083,519.
Patented Jan. 6, 1914.
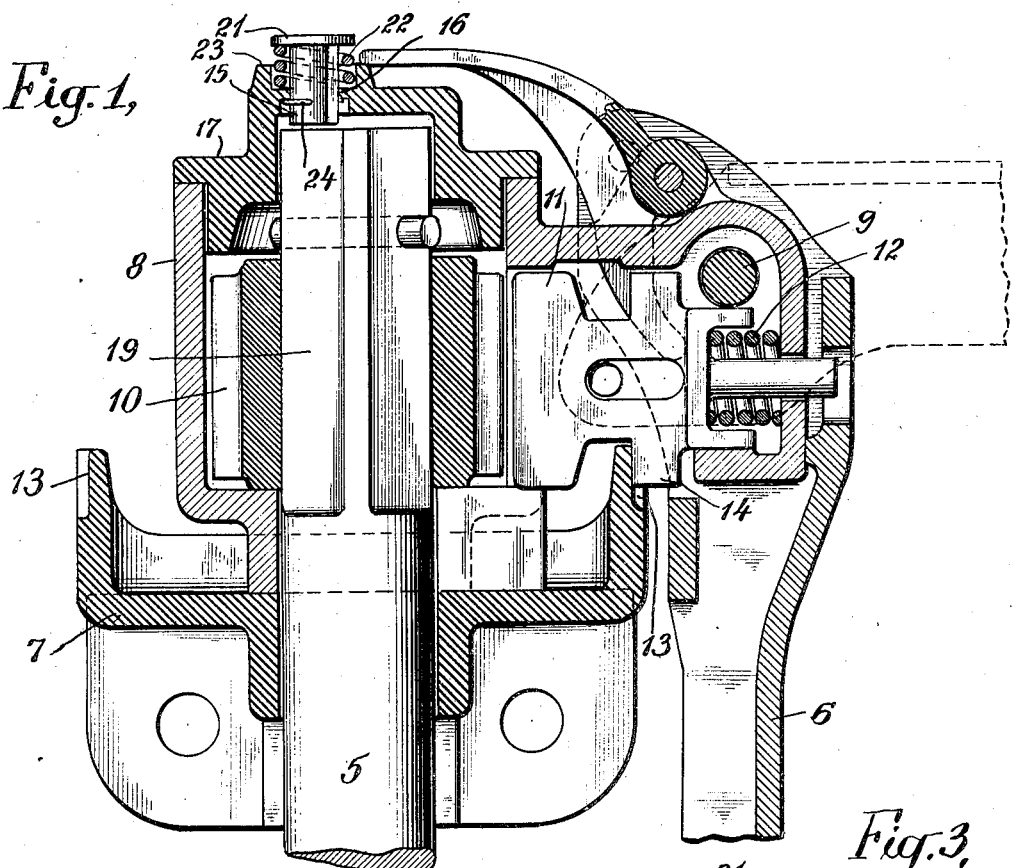
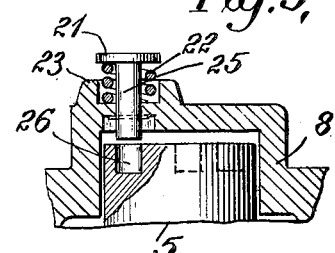
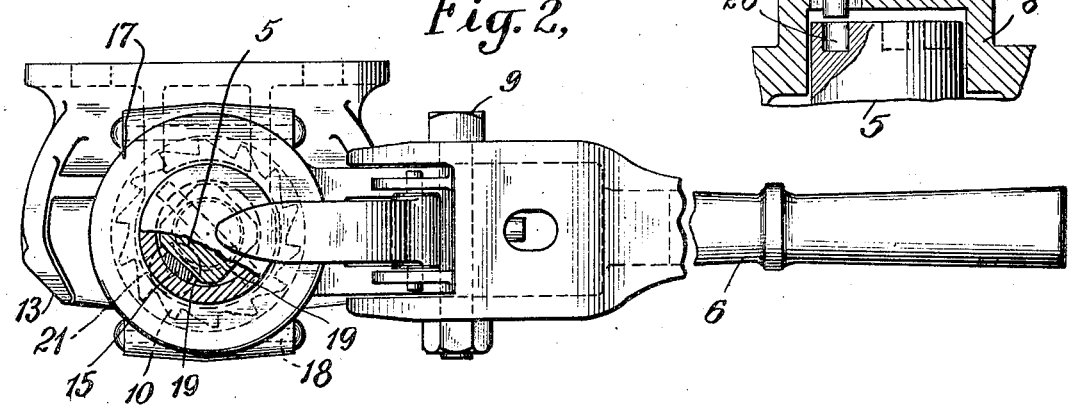
WITNESSES
INVENTOR
Robert H. Blackall
BY
ATTORNEYS

UNITED STATES PATENT OFFICE.

ROBERT H. BLACKALL, OF PITTSBURGH, PENNSYLVANIA, ASSIGNOR TO RATCHET BRAKE COMPANY, OF NEW YORK, N. Y., A CORPORATION OF DELAWARE.

RATCHET BRAKE-LEVER.

1,083,519.

Specification of Letters Patent.

Patented Jan. 6, 1914.

Application filed April 22, 1913. Serial No. 762,942.

*To all whom it may concern:*

Be it known that I, ROBERT H. BLACKALL, a citizen of the United States, residing at Pittsburgh, county of Allegheny, State of Pennsylvania, and whose post-office address is Farmers Bank Building, Pittsburgh, Pennsylvania, have invented certain new and useful Improvements in Ratchet Brake-Levers; and I do hereby declare the following to be a full, clear, and exact description of the invention, such as will enable others skilled in the art to which it appertains to make and use the same.

This invention relates to that class of hand-actuated brake mechanisms wherein an oscillating movement of an operating lever or handle, is, through the medium of suitable clutch mechanism converted into a brake-applying movement of the brake staff. In devices of this character it sometimes happens that after effecting a hand application of the brakes in this way, the brakes will stick and fail to release properly. If at such times the brake staff could be given a reverse or brake-releasing movement this would be sufficient in most cases to effect a proper release of the brakes. As the function of the clutch mechanism is to couple the handle to the staff in the brake-applying direction of movement and to uncouple the handle in its reverse or retractive movement this clutch mechanism is incapable of being utilized for the purpose of effecting a reverse or brake-releasing movement of the staff.

The object of my invention is to provide simple and effective means by which this reverse or so-called brake-releasing movement may be imparted to the brake staff.

The invention accordingly consists in providing a movable connection capable of being projected into engagement with the brake staff to thereby constitute a direct connection between the handle and staff by which the requisite brake-releasing movement of the staff may be effected.

In the specific embodiment herein chosen to illustrate the invention, the operating handle is carried by a sleeve rotatably engaged on the brake staff and the movable connection is mounted on the closed upper end of this sleeve in position to be projected downward into engagement with the upper end of the staff.

Various features of the invention will appear as the specification proceeds.

The drawings accompanying this specification illustrate a concrete and preferred embodiment of the invention and also a slight modification thereof, but I would have it understood that various other changes and modifications may be made without departing from the true spirit and scope of the invention.

In the drawings: Figure 1 is a vertical sectional view of a hand-actuated brake mechanism embodying the invention; Fig. 2 is a plan view of the same, with a portion of the cap which forms the closed upper end of the sleeve, broken away to illustrate the engagement of the movable connection with the upper end of the brake staff; Fig. 3 is a broken detail view of a slight modification.

Referring to the drawings in detail: 5 designates a brake staff and 6 a handle or hand lever for operating the same. The brake staff is journaled in a suitable bearing bracket 7 and it is connected with the brake rigging of the car by the usual chain or other suitable connecting medium (the latter not shown). The handle is engaged upon the staff by means of a sleeve 8 to which it is connected, this sleeve being loosely rotatable on the staff so as to permit of the oscillating movement of the handle in respect to the staff. In this particular case the handle is shown pivotally connected with the sleeve by means of a pivot pin or bolt 9, so that when not in use it may be folded down out of the way as indicated in Fig. 1.

The clutch mechanism in the case herein illustrated is in the form of a ratchet 10 fast on the staff and an engaging pawl 11 carried by the sleeve, the pawl being mounted so that it may slide in a plane transverse of the staff into and out of engagement with the ratchet and a spring 12 being provided for engaging the pawl with the ratchet. The operation of this mechanism will be obvious; when the handle is swung clockwise as shown in Fig. 2, the pawl will make positive engagement with the teeth of the ratchet and the brake staff will thereby be given a partial rotary movement in the direction of applying the brakes. As the handle is swung back in the reverse direction, the pawl will slip past the teeth of the ratchet without having any effect on it. In this way, the oscillatory movement of the handle is converted into a brake-applying movement of the staff. During the reverse or retractive movement of the handle the brake staff may be held against reverse rotation by means of the customary foot pawl (not shown). Means are usually provided also for automatically unclutching the handle from the staff when the handle is turned to a predetermined position. Such a means is here shown in the form of the two cam members 13 which, when the handle is swung through a predetermined arc, engage a dependent lug 14 on the pawl and retract it from engagement with the ratchet.

The movable connection or connector which forms the medium through which the brake-releasing movement is imparted to the staff is, in Figs. 1 and 2, designated 15, it being there shown in the form of a pin or plunger slidingly guided in an opening 16 in the cap 17, which forms a closed upper end to the sleeve. This cap is shown as secured fast upon the sleeve by means of the two key pins 18, which, as indicated in Fig. 2, are engaged in registering openings in the walls of the cap and sleeve respectively. A common practice has been to fasten the ratchet or relatively fixed clutch member on the staff by making the staff with a squared or flattened upper end and the clutch member with a correspondingly shaped opening to fit the end. In this first form of the invention, I propose to take advantage of the flattened shape thus given the staff for securing a gripping engagement with the staff. Thus in the illustration the staff is formed with a squared end portion 19 on which the ratchet is engaged and the movable connector 15 is so constructed and arranged that when projected downward, it will grip against one of the flat sides of such squared portion.

Fig. 2 illustrates how the inner wall of the cap and the squared portion of the staff form between them, in effect, a keyway for the reception of the movable connector. When the connector is projected into this keyway, it serves to key the sleeve, and hence the handle carried thereby, to the staff. The connector, when thus operated, provides a positive connection between the handle and staff by which the staff may be rotated in either direction. The movable connector is preferably provided with a head or handle portion 21 on its upper end for operating the same, and a spring 22 or equivalent device may be provided for normally holding the connector in its retracted position. This spring may be protected from injury by inclosing it within an upstanding annular rim or flange 23, which, in connection with the outstanding head 21, serves to effectually house the spring. An abutment 24 may be provided for limiting the upward retractive movement of the connector.

The form of the invention illustrated in Fig. 3 as applied to a shaft, the end of which is necessarily flattened, is similar to the form already described except that in this case the movable connector, here designated 25, is made to engage in any one of a series of seats or sockets 26 formed in the end of the staff. It will be observed that this form of connector, as well as the form of connector shown in Figs. 1 and 2, makes a connection which may be manipulated like a latch to convert an oscillating movement of the brake handle into a rotary movement of the staff in either direction.

The advantage of mounting the connector upon the closed upper end of the sleeve which carries the handle will be readily appreciated because it will be seen that this places it in a convenient position to be controlled by the brakeman with one hand, while he is operating the hand lever with his other hand. The sleeve, being closed at its upper end, serves to entirely inclose and protect the clutch mechanism and the upper end of the brake staff. All possibility of interference between the clutch mechanism and the direct connection is avoided by locating the clutch pawl at the side, so as to operate in a plane transverse or at right-angles to the staff, and the direct connection at the end so as to operate in a plane longitudinally of the staff. It is possible, however, to have the connector act on or through the clutch pawl so that the projection of the connector is effective to lock the pawl against retraction and thereby establish positive connection between the handle and the staff.

Having thus described my invention what I claim is:

1. In hand-actuated brake mechanism, the combination with a brake-staff, a sleeve rotatably engaged on the staff, an operating handle carried by the sleeve and clutch mechanism for converting an oscillating movement of the handle into a brake-applying movement of the staff, of a movable connector carried by the sleeve adapted to be projected into engagement with the staff to thereby provide an auxiliary connection between the handle and staff for effecting a brake releasing movement of the staff.

2. In hand-actuated brake mechanism, the combination with a brake staff, a sleeve rotatably engaged on the staff and provided with a closed upper end overlying the upper end of the staff, an operating handle carried by the sleeve, and clutch mechanism for converting an oscillating movement of the handle into a brake-applying movement of the staff, of a movable connector mounted on the closed upper end of the sleeve adapted to be projected downward into engagement with the upper end of the staff to thereby provide an auxiliary connection between the handle and staff for effecting a brake releasing movement of the staff.

3. In hand-actuated brake mechanism, the combination with a brake staff, a sleeve rotatably engaged on the staff, an operating handle carried by the sleeve, and clutch mechanism for converting an oscillating movement of the handle into a brake-applying movement of the staff, of a retractile connection carried by the sleeve adapted to be projected into engagement with the staff, and a spring acting on the said connection to normally hold the same disengaged from the staff.

4. In hand-actuated brake mechanism, the combination of a brake staff, a sleeve rotatably engaged on the upper end of the staff, a cap closing the upper end of the sleeve and overlying the upper end of the brake staff, an operating handle carried by the sleeve, clutch mechanism for converting an oscillating movement of the handle and sleeve into a brake-applying movement of the staff, and a slidable connection mounted on the cap adapted to be projected into engagement with the staff to provide an auxiliary connection between the handle and staff for effecting a brake-releasing movement of the staff.

5. In hand actuated brake mechanism, the combination of a brake staff, a ratchet fast on the staff, a sleeve rotatably engaged on the staff, a handle for operating said sleeve, a pawl carried by the sleeve adapted to be projected transversely of the staff into engagement with the ratchet on the staff, and an auxiliary connection carried by the sleeve adapted to be projected longitudinally of the staff into engagement with the staff.

6. In hand-actuated brake mechanism, the combination of a brake staff, a sleeve rotatably engaged on the staff, said staff and sleeve having a recess therebetween forming a keyway, an operating handle carried by the sleeve, clutch mechanism between the sleeve and staff for converting an oscillating movement of the handle and sleeve into a brake-applying movement of the brake staff and a retractile key mounted on the sleeve adapted to be projected into the keyway aforesaid to thereby form a positive connection between the sleeve and staff.

7. In hand-actuated brake mechanism, the combination of a brake staff provided with a flattened end portion, a clutch member fastened on the staff by being engaged on the end portion thereof, a sleeve rotatably engaged on the staff, an operating handle carried by the sleeve, a clutch member carried by the sleeve for coöperation with the clutch member fast on the staff to convert an oscillating movement of the handle and sleeve into a brake-applying movement of the staff, and a retractile member mounted on the sleeve adapted to be projected into engagement with a flat portion of the staff to constitute a direct connection between the sleeve and staff.

8. In hand-actuated brake mechanism, the combination of a brake staff, a sleeve rotatably engaged thereon, a handle carried by said sleeve, a clutch mechanism for converting an oscillating movement of the handle and sleeve into a brake-applying movement of the staff, a connector slidably mounted on the sleeve and adapted to be projected into engagement with the staff, a head on the outer end of the connector for operating the same, an annular flange carried by the sleeve and surrounding the connector and a retracting spring seated within the said flange and engaged beneath the head of the connector.

In testimony whereof I affix my signature, in presence of two witnesses.

ROBERT H. BLACKALL.

Witnesses:
M. A. BILL,
WILLIAM H. DAVIS.